Patented Jan. 15, 1935

1,987,694

UNITED STATES PATENT OFFICE 1,987,694

METHOD OF PRODUCING LAMINATED MATERIAL

Gerald H. Mains, Murrysville, Pa., assignor to Westinghouse Electric & Manufacturing Company, a corporation of Pennsylvania No Drawing. Application December 27, 1930, Serial No. 505,189

2 Claims. (Cl. 91—70)

My invention relates to laminated materials and more particularly to methods of so producing such materials that it shall be practically odorless.

The principal object of my invention is to economically produce laminated sheet material, which shall be substantially free from objectionable odors, by a process which comprises impregnating or coating the sheets with a solution of a binding agent, washing the treated material in water or other appropriate solvent after it has been partially dried, and then drying the washed material prior to the normal molding operation.

A further object of my invention is to provide a method of producing laminated material, which shall be substantially free from odor, by a method which comprises impregnating or coating the material with a solution of a suitable resin, or resinous mixture, heating to convert the resin into a comparatively insoluble form, washing with the solvent solution and finally drying the washed material.

A still further object of my invention is to produce laminated sheet material by a process which comprises coating or impregnating the sheet material with a solution of a resin, or resinous mixture, partially drying, passing the sheet material through a washing medium and then drying the washed material to such an extent that a desired amount of volatile material will be present in the finished product.

As is well known, laminated sheet material, impregnated with a synthetic resin, such as a phenolic condensation product, has been extensively employed for electrical and other insulation purposes and for mechanical applications. Its use for interior decorating purposes, however, has been limited because the material is generally accompanied by strong and obnoxious odors which are principally caused by the presence of uncombined ingredients, such as phenol, cresol, formaldehyde, furfural or urea. Attempts have been made to eliminate these objectionable odors by means of elaborate devices for washing and purifying the resins which are later to be employed for impregnating purposes. The time required for the purifying operations and the difficulty encountered in separating large masses of resinous material from aqueous or other washing mixtures, however, render such methods commercially impracticable. Attempts have also been made to purify and deodorize the laminated sheet material after the molding operation by prolonged baking or repeated vacuum-drying operations. In some cases, these methods have been combined with the employment of a low volatile content in the treated sheet before molding. Such methods of treating the molded laminated material are unsatisfactory because they are costly, time-consuming, do not satisfactorily remove the objectionable odors and tend to weaken the final product and render it brittle, this being especially true when the volatile content is low.

I have made the discovery that laminated material which shall be substantially free from obnoxious odors may be produced by first impregnating the sheets with the binding agent, partially drying, and then washing the sheets with water or other suitable medium and finally drying to the desired extent, preferably at an elevated temperature.

In practicing my invention, the fibrous material is first impregnated with the resin in the usual manner. For example, the sheets may be passed through a solution of a suitable binding agent, such as a phenolic condensation product, a urea or thiourea-formaldehyde resin or a mixture of the two or through solutions of other synthetic or natural resins, such as phenol-furfural resins, shellac, pitch, copal or dammar. The impregnated sheet is then partially dried, the extent of drying depending upon the solvent which is subsequently utilized as a washing medium and also upon the properties desired in the finished product.

The impregnated and partially dried sheet is next passed through, or washed with, water or a solution which is a solvent for the free or uncombined ingredients of the binding agent, although it may sometimes be desirable to employ a solvent that contains one or more ingredients which are capable of reacting or combining with the formaldehyde or other ingredients which produce the obnoxious odors.

Since water is a solvent for both phenol and formaldehyde, it may be utilized alone when a phenol-formaldehyde resin is present, or I may employ a solution comprising a mixture of water and alcohol or a dilute solution of an alkali or salt. For example, in certain applications, such as when a cresol-formaldehyde resin is employed, a dilute solution containing .5% to 2%, by weight, of an alkali, or salt such as, sodium or potassium hydroxide or sodium carbonate, or mixtures thereof, may be utilized, as such solutions have been found especially effective in removing free cresol.

According to my preferred process, the water or solution is placed in a suitable series of receptacles and the sheet, which has been impregnated with a solution of the resin or gum and partially dried, is passed through the washing solution, or, if the sheet has only been coated on one side with the resin, the washing solution may be brought into contact with the impregnated surface by any suitable means, such as by spraying, or it may be washed in the usual manner. During the treatment of the coated paper, or passage of the impregnated sheet through the solution, provision is made for circulating fresh washing material through the treating vats in a direction counter to the movement of the treated material. The washed material in next passed through a suitable drying chamber, such as a vertical drying tower or a horizontal drying oven, which is maintained at an elevated temperature by any suitable means, as by coils containing hot circulating water or steam. While the treated material is being passed through the drying oven, it is desirable to have a controlled circulation of air through the drying oven in order to readily remove the volatile constituents and insure uniform drying of the washed material.

The temperature utilized in the drying oven and the speed of treatment, as well as the volume of air which is blown through the oven are dependent upon each other and will vary in accordance with the type of resin employed and the volatile content desired in the finished sheets. As a general rule, when the fibrous sheet material is passed through the drying oven 100 feet in length at the rate of 60 to 150 inches per minute, and air is blown through the oven at the rate of 3000 to 4000 cubic feet per minute, the temperature will preferably be maintained at 60° to 120° C. It will, of course, be understood that, by varying the speed of treatment, the other factors may also be correspondingly changed. For example, the speed of treatment may be increased by employing a higher temperature or by increasing the rate at which the air is blown through the oven.

When it is desired to produce molded laminated products which shall be practically odorless, the speed of treatment and the temperature and the amount of air which is blown through the oven are regulated so that the final volatile content of the treated sheets will vary between .5% and 2%, by weight, although, for special applications, such as for refrigerators, where obnoxious odors are especially undesirable and where a very high mechanical strength is not essential, the volatile content should be maintained between .1% to 1%. A volatile content which is too low tends to produce a weak and brittle laminated material while, if the volatile content is too high, a certain proportion of the ingredients having obnoxious odors will be retained, and, in certain instances, the laminated product will have the tendency to adhere to the plates during the molding operation.

The volatile content may be determined in any desired manner. A convenient method is to remove a sample of the sheet as it comes from the drying oven, and, after weighing, dry it by suitable means at a temperature of 105° to 110° C. for a period of 15 minutes to 30 minutes, depending upon its thickness, and determine the volatile content by the loss of weight of the sample. In the event that the volatile content is too high or too low, the temperature of the drying oven, the speed of treatment or the amount of air blown through the oven may be varied until a dried sheet having the desired volatile content is obtained.

After the washed material has been dried to the desired extent, the material may be cut into sheets which are superimposed upon each other and molded, under heat and pressure, in the usual manner, care being exercised to avoid utilizing lubricants which have an objectionable odor in the molding operations, or, if it is not desired to mold the sheets immediately, they may be placed in a gas-tight container or wrapped with gas- and-moisture-proof paper to prevent the absorption of moisture or change in volatile content.

When the amount of volatile content is stated in the specification and claims, it will be understood that it does not include high boiling plasticizers, such as diethyl, phthalate, dibutyl phthalate or camphor, which are added to the resin to increase the flexibility of the finished product. When such plasticizers are employed, a higher volatile content in the washed material is desirable.

The following specific example will serve to illustrate and explain my invention. A sheet of fibrous material, impregnated with a cresol-formaldehyde resin in the proportion of 50% resin, by weight, to 50% paper, by weight, and having a volatile content of approximately 3%, was passed through a vat of water through which water was circulated at the rate of ten gallons per minute, the fresh water being supplied at the top of the vat and the impure water being allowed to pass out at the bottom. The paper was then passed over suitable rollers and through a drying tower having a length of about 100 feet and heated, by steam coils, to a temperature of 90° to 100° C. The paper was passed through the drying tower at a speed of 120 to 150 inches per minute, while heated air, at the same time, was passed through the drying tower in a direction opposite to the movement of the paper at an air velocity of 4,000 cubic feet per minute. The volatile content of the treated paper was maintained at from 1% to 2%.

The paper was then cut into sheets of the desired length, a plurality of the sheets assembled between lubricated metal pressing plates, and molded under 1,000 to 2,000 pounds pressure per square inch at a temperature of 160° to 180° C. after which the press was cooled and the molded material removed.

Various types of fibrous material, such as paper, fabrics, sheet asbestos or wood veneer may be impregnated with a solution of a resin or gum and the uncombined ingredients and even the impurities may be removed or rendered neutral by my process. The resin may be applied by passing the fibrous material through the impregnating solution for a sufficient period of time to thoroughly impregnate the sheets, or a heavy superficial coating may be applied to either one or both sides by suitable means, such as spraying or brushing or by passing the sheets between rollers, one of which passes through the solution of resin and is brought into contact with the sheets. When washing fibrous material which has been coated only on one side, it has been found advisable to employ a drying oven of the arched type in order to prevent curling of the paper during the drying process.

My improved method is especially effective for removing the impurities and is superior to previous methods because the resin is present as a thin film and, consequently, a large area is exposed to the washing medium to facilitate the removal of the uncombined ingredients which emit obnoxious odors and also to remove impurities, thereby rendering the molded product made from these washed sheets suitable for photographic applications and other purposes where freedom from such ingredients is highly essential.

It is evident from this description that the prior difficulty in removing odors from large masses of resin is minimized by treating the resin in thin sheets. This permits fluid to penetrate substantially all the mass of resin being treated, and to react with the odorous substances in some cases, or to form low boiling compositions therewith. This latter would occur, for example, in adding water to phenol or formaldehyde. Before applying this fluid, preliminary drying of the surface of the sheet hardens the surface sufficiently to withstand subsequent treatment, and yet does not extend any condensation or polymerization action under the surface to any considerable extent. Subsequently, on heating, the odorous material is removed more readily because of the formation of low boiling compositions in some cases. Also there is the effect of vapor distillation, which reduces the vapor pressure of the material under treatment. Without being limited to theories, it is evident, upon use of this invention, that even extremely small residual amounts of odorous substances are eliminated readily.

My process may be applied to fibrous material which has been previously impregnated with a binding agent or the impregnating and washing operation may be combined in one continuous process.

In such cases, the sheet material is first passed through one or more vats containing the binding agent, partially dried after each passage, and then passed through one or more washing mediums, after which it is dried to the requisite extent in the drying oven. The speed of this treatment, and the temperature of the initial and final drying compartments of the oven must be so regulated as to simultaneously obtain proper curing of the resin and adequate evaporation of the washing medium. Often, a single washing operation will reduce the objectionable odors to the point where the molded laminated sheet material will be entirely suitable for many applications, such as for interior decorating purposes. However, in other cases, where even slight traces of odorous ingredients are objectionable, as in food containers, such as refrigerators, it has been found desirable to subject the impregnated sheets to more than one washing operation.

In certain types of fibrous material, such as wood veneer, the continuous process may not be applicable. In such cases, satisfactory results are obtained by immersing single strips or a plurality of strips which have been impregnated or coated with a resin or binding agent partially dried, and then washed in suitable baths supplied continuously with fresh washing medium or by applying the washing medium to the strips by any suitable means, such as by spraying. The strips may then be passed between squeezer rolls to remove the washing medium remaining on the surface and dried in an oven until the desired volatile content has been attained.

The particular washing medium employed will depend upon the resin or binding agent which is utilized. When formaldehyde is utilized in the formation of the resins, water alone or water containing a small quantity of sodium bisulphite provides an effective means for removing or neutralizing the objectionable odor of formaldehyde and this is especially true when the resin contains an excessive quantity of free formaldehyde. In general, it may be stated that dilute aqueous solutions of alkalis or salts are particularly adapted for washing materials which have been impregnated or coated with resins of the phenolic-aldehyde type. Where dilute alkaline solutions are employed, as a washing medium, in the first washing operation, a second washing operation, utilizing water as the washing medium, may be necessary in order to remove traces of the alkali in cases where the finished product is to be utilized as an electrical insulator.

When water is utilized as the washing medium, it is sometimes desirable to remove the traces of water employed in the washing operation by passing the treated material through a subsequent alcohol bath or baths, or, if desired, a mixture of water and alcohol or alcohol alone may be utilized as the washing medium, providing the binding agent is not soluble in alcohol or is heated to the point where the resin has passed from the soluble to the insoluble or semisoluble stage, or if the speed of passage of the impregnated or coated material is so rapid that the loss of resin is negligible. Concentrated alcoholic solutions are especially suitable when the fibrous material, such as paper, has only a low resin content or when it has only been superficially coated, or coated on one side, because water or dilute alkali or salt solutions have the tendency to cause the paper to break because of the absorption of water. These alcoholic solutions are also especially suitable as wasting mediums when the impregnated material has a high content of free cresol.

Irrespective of the washing medium employed, I have found it highly desirable to provide means whereby a continuous supply of fresh washing medium is added as required, and the partially saturated medium withdrawn from the operation. When water is utilized as the washing medium, I have found it convenient to supply pure water at the top of the vat and permit the impure water to pass out at the bottom.

While I have disclosed my invention in considerable detail and have given specific examples, it will be understood that the examples should be construed as illustrative and not by way of limitation. For instance, I do not desire to restrict the application of my improved method to material which subsequently is molded, as the washed material may be utilized for various purposes, such as tape for insulating purposes. Other solvents and solutions may also be utilized as washing mediums, such as methanol, benzine, benzol, and acetone or mixtures of two or more of such solvents.

Other modifications may be effected, without departing from the spirit and scope of my invention. It is, therefore, desired that only such limitations shall be imposed thereon as are indicated in the appended claims.

I claim as my invention:

1. A process comprising impregnating base sheets with phenol-aldehyde resin, partially drying the surface of the sheets, then washing the sheets in aqueous alkaline liquid, and then heating the sheets at 60° to 120° C. to remove odorous substances and retain heat-hardening properties of the resin.

2. A process comprising impregnating base sheets with phenol-aldehyde resin, partially drying the surface of the sheets, then washing the sheets in aqueous alkaline liquid, and then heating the sheets at 60° to 120° C. until the volatile content is 0.1% to 2% to remove odorous substances and retain heat-hardening properties of the resin.

GERALD H. MAINS.